US011248531B1

(12) United States Patent
Berry

(10) Patent No.: US 11,248,531 B1
(45) Date of Patent: Feb. 15, 2022

(54) TURBOMACHINE CLEARANCE CONTROL USING A FLOATING SEAL

(71) Applicant: General Electric Company, Schenectady, NY (US)

(72) Inventor: Jonathan Dwight Berry, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/126,333

(22) Filed: Dec. 18, 2020

(51) Int. Cl.
*F02C 7/28* (2006.01)
*F01D 11/02* (2006.01)
*F01D 11/14* (2006.01)

(52) U.S. Cl.
CPC .............. *F02C 7/28* (2013.01); *F01D 11/025* (2013.01); *F01D 11/14* (2013.01); *F05D 2240/55* (2013.01); *F05D 2260/32* (2013.01); *F05D 2300/173* (2013.01)

(58) Field of Classification Search
None
See application file for complete search history.

(56) References Cited

U.S. PATENT DOCUMENTS

| 4,513,567 A | 4/1985 | Deveau et al. |
| 6,152,685 A | 11/2000 | Hagi |
| 6,220,602 B1 | 4/2001 | Webster et al. |
| 6,450,762 B1 | 9/2002 | Munshi |
| 6,877,952 B2 | 4/2005 | Wilson |
| 9,360,118 B2 | 6/2016 | Fukuhara |
| 9,732,622 B1* | 8/2017 | Mills ..................... F16J 15/3448 |
| 9,771,821 B1* | 9/2017 | Mills ..................... F16J 15/445 |
| 10,309,246 B2* | 6/2019 | Miranda ................. F01D 11/24 |
| 2010/0327534 A1 | 12/2010 | Powar et al. |
| 2017/0276359 A1* | 9/2017 | Berry ..................... F23R 3/346 |

FOREIGN PATENT DOCUMENTS

| GB | 2108586 A | 5/1983 |
| JP | 3564286 B2 | 9/2004 |

* cited by examiner

*Primary Examiner* — Michael Lebentritt
(74) *Attorney, Agent, or Firm* — Dority & Manning, P.A.

(57) ABSTRACT

A sealing arrangement includes a stationary component, a first slot is defined between an outer wall and a first inner wall, a second slot is defined between the outer wall and a second inner wall. A rotating component moves in a circumferential direction relative to the stationary component. The rotating component includes a tip rail. A floating seal positioned between the stationary component and the rotating component. The floating seal includes an axial member having a first arm extending into the first slot and a second arm extending into the second slot. The floating seal includes a first radial member and a second radial member that extends from the axial member. A plurality of magnets coupled to the stationary component, the rotating component, and the floating seal. The plurality of magnets is arranged such that the floating seal is contained between the stationary component and the rotating component.

20 Claims, 7 Drawing Sheets

TURBOMACHINE CLEARANCE CONTROL USING A FLOATING SEAL

FIELD

The present disclosure relates generally to turbomachine clearances. In particular, this disclosure relates to controlling clearances between stationary components and rotating components in a turbomachine.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

In certain applications, a clearance may exist between components that move relative to one another in the turbomachine. For example, a clearance may exist between rotary and stationary components in a rotary machine, such as a compressor, a turbine, or the like. The clearance may increase or decrease during operation of the rotary machine due to temperature changes or other factors. As can be appreciated, a smaller clearance may improve performance and efficiency in a compressor or turbine, because less fluid leaks between blades and a surrounding shroud. However, a smaller clearance also increases the potential for a rub condition. The operating conditions also impact the potential for a rub condition. For example, the potential for a rub condition may increase during transient conditions and decrease during steady state conditions.

Sealing assemblies are often positioned within the clearances to restrict the amount of flow passing through the clearance by keeping the space between the rotating component and the stationary component small without requiring the components to be close to one another.

Known sealing assemblies are most effective once the gas turbine has reached steady state operating conditions. For example, once both the rotor assembly and the stator assembly reach steady state operating temperatures, the assemblies have thermally expanded and fully engage the sealing assembly. As such, an improved sealing assembly for sealing between a rotor assembly and a stator assembly is desired in the art. In particular, a sealing assembly that is effective at all operating conditions of the gas turbine is desired.

BRIEF DESCRIPTION

Aspects and advantages of the sealing arrangements and rotor assemblies in accordance with the present disclosure will be set forth in part in the following description, or may be obvious from the description, or may be learned through practice of the technology.

In accordance with one embodiment, a sealing arrangement for use in a gas turbine is provided. The sealing arrangement includes a stationary component having an outer wall, a first inner wall, and a second inner wall. the first inner wall and the second inner wall are spaced apart from the outer wall. a first slot is defined between the outer wall and the first inner wall. a second slot is defined between the outer wall and the second inner wall. The sealing arrangement further includes a rotating component that is spaced apart from the stationary component. The rotating component moves in a circumferential direction relative to the stationary component. The rotating component includes a tip rail. The sealing arrangement further includes a floating seal positioned between the stationary component and the rotating component. The floating seal includes an axial member having a first arm extending into the first slot and a second arm extending into the second slot. The floating seal includes a first radial member and a second radial member that extends from the axial member. The sealing arrangement further includes a plurality of magnets coupled to the stationary component, the rotating component, and the floating seal. The plurality of magnets are arranged such that the floating seal is contained between the stationary component and the rotating component.

In accordance with another embodiment, rotor assembly for a gas turbine is provided. The rotor assembly includes a plurality of rotor blades extending radially outward from a rotor disk. Each rotor blade in the plurality of rotor blades including a platform, a tip rail, and an airfoil extending between the platform and the tip rail. The tip rails of each rotor blade in the plurality of rotor blades collectively form a tip rail ring that extends circumferentially around a centerline of the gas turbine. The rotor assembly further includes a plurality of shroud blocks that collectively form a shroud ring that extends circumferentially around the centerline of the gas turbine and is radially spaced apart from the tip rail ring. Each shroud block having an outer wall, a first inner wall, and a second inner wall. The first inner wall and the second inner wall radially spaced apart from the outer wall such that a first slot is defined between the outer wall and the first inner wall and a second slot is defined between the outer wall and the second inner wall. The rotor assembly further includes a floating seal that is positioned between the tip rail ring and the casing. The floating seal includes an axial member having a first arm that extends into the first slot and a second arm that extends into the second slot. The floating seal includes a first radial member and a second radial member that extend from the axial member. The rotor assembly further includes a plurality of magnets coupled to the shroud block, the tip rail, and the floating seal, the plurality of magnets arranged such that the floating seal is contained between the tip rail and the shroud block.

These and other features, aspects and advantages of the present sealing arrangements and rotor assemblies will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present sealing arrangements and rotor assemblies, including the best mode of making and using the present systems and methods, directed to one of ordinary skill in the art, is set forth in the specification, which makes reference to the appended figures, in which.

DETAILED DESCRIPTION

Figure 1:
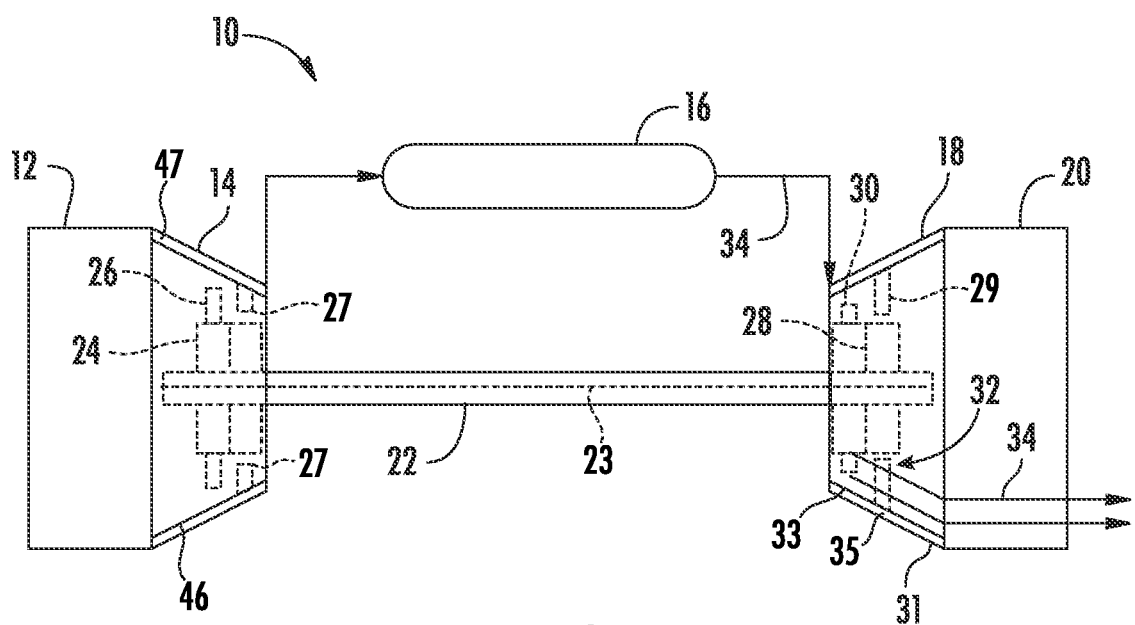
FIG. 1 is a schematic illustration of a turbomachine in accordance with embodiments of the present disclosure.

Reference now will be made in detail to embodiments of the present sealing arrangements and rotor assemblies, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component. terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

As used herein, the term "clearance" or the like shall be understood to refer to a spacing or gap that may exist between two or more components of the system that move relative to one another during operation. The clearance may correspond to an annular gap, a linear gap, a rectangular gap, or any other geometry depending on the system, type of movement, and other various factors, as will be appreciated by those skilled in the art. In one application, the clearance may refer to the radial gap or space between housing components surrounding one or more rotating blades of a compressor, a turbine, or the like. By controlling the clearance using the presently disclosed techniques, the amount of leakage between the rotating blades and the housing may be actively reduced to increase operational efficiency, while simultaneously minimizing the possibility of a rub (e.g., contact between housing components and the rotating blades). As will be appreciated, the leakage may correspond to any fluid, such as air, steam, combustion gases, and so forth.

As discussed herein, a radial gap between the turbine blades and a shroud may increase or decrease during operation due to temperature changes or other factors. For instance, as the turbine heats up during operation, thermal expansion of the turbine housing components may cause the shroud to move radially away from the rotational axis, thus increasing the clearance between the blades and the shroud. This is generally undesirable because combustion gases that bypass the blades via the radial gap are not captured by the blades and are, therefore, not translated into rotational energy. This reduces the efficiency and power output of the turbine engine.

Referring now to the drawings, FIG. 1 illustrates a schematic diagram of one embodiment of a turbomachine, which in the illustrated embodiment is a gas turbine 10. Although an industrial or land-based gas turbine is shown and described herein, the present disclosure is not limited to a land based and/or industrial gas turbine unless otherwise specified in the claims. For example, the invention as described herein may be used in any type of turbomachine including but not limited to a steam turbine, an aircraft gas turbine, or a marine gas turbine.

As shown, gas turbine 10 generally includes an inlet section 12, a compressor section 14 disposed downstream of the inlet section 12, a plurality of combustors (not shown) within a combustor section 16 disposed downstream of the compressor section 14, a turbine section 18 disposed downstream of the combustor section 16, and an exhaust section 20 disposed downstream of the turbine section 18. Additionally, the gas turbine 10 may include one or more shafts 22 coupled between the compressor section 14 and the turbine section 18.

The compressor section 14 may generally include a plurality of rotor disks 24 (one of which is shown) and a plurality of rotor blades 26 extending radially outwardly from and connected to each rotor disk 24. Each rotor disk 24 in turn may be coupled to or form a portion of the shaft 22 that extends through the compressor section 14. The compressor 12 further includes one or more stator vanes 27 arranged circumferentially around the shaft 22. The stator vanes 27 may be fixed to at least one of an outer casing 47 and an inner casing 46 that extends circumferentially around the rotor blades 26.

The turbine section 18 may generally include a plurality of rotor disks 28 (one of which is shown) and a plurality of rotor blades 30 extending radially outwardly from and being interconnected to each rotor disk 28. Each rotor disk 28 in turn may be coupled to or form a portion of the shaft 22 that extends through the turbine section 18. The turbine section 18 further includes an outer turbine casing 31 and an inner turbine casing 33 that circumferentially surround the portion of the shaft 22 and the rotor blades 30, thereby at least partially defining a hot gas path 32 through the turbine section 18. The inner turbine casing 33 may be configured to support a plurality of stages of stationary nozzles 29 extending radially inwardly from the inner circumference of the inner turbine casing 33. The inner turbine casing 33 may also be configured to support a plurality of shroud sections or blocks 35 that, when installed around the inner circumference of the inner turbine casing 33, abut one another so as to define a substantially cylindrical shape surrounding the shaft 22.

During operation, a working fluid such as air flows through the inlet section 12 and into the compressor section 14 where the air is progressively compressed, thus providing pressurized air to the combustors of the combustor section 16. The pressurized air is mixed with fuel and burned within each combustor to produce combustion gases 34. The combustion gases 34 flow through the hot gas path 32 from the combustor section 16 into the turbine section 18, wherein energy (kinetic and/or thermal) is transferred from the combustion gases 34 to the rotor blades 30, causing the shaft 22 to rotate. The mechanical rotational energy may then be used to power the compressor section 14 and/or to generate electricity. The combustion gases 34 exiting the turbine section 18 may then be exhausted from the gas turbine 10 via the exhaust section 20.

As shown, the gas turbine 10 may define an axial direction A substantially parallel to and/or along an axial centerline 23 of the gas turbine 10, a radial direction R perpendicular to the axial centerline 23, and a circumferential direction C extending around the axial centerline 23.

Figure 2:
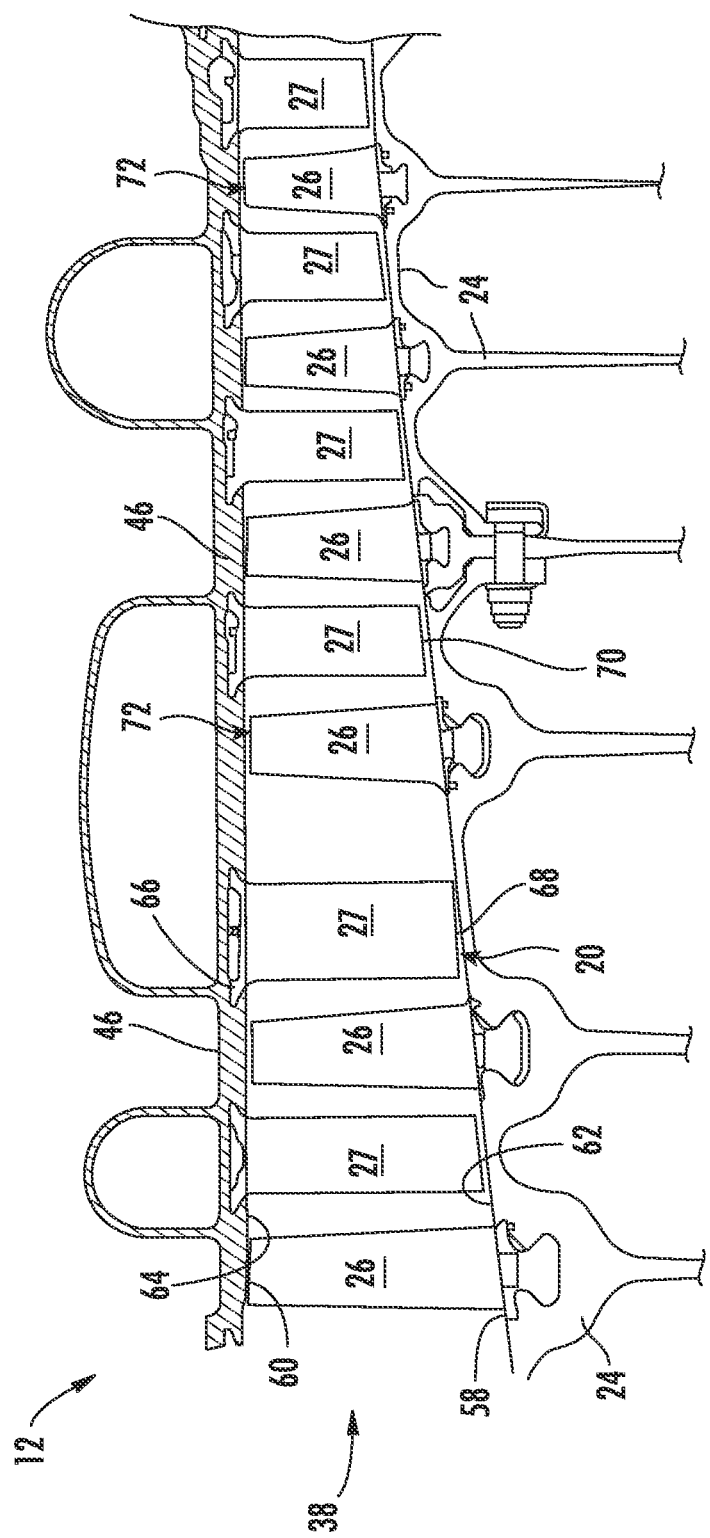
FIG. 2 illustrates a cross sectional view of a compressor section in accordance with embodiments of the present disclosure.

FIG. 2 is a cross sectional view of the major components of an exemplary gas turbine compressor section, including rotor and stator assemblies. The compressor section 12 includes a rotor assembly positioned within inner casing 46 to define a compressed air 38 flow path. The rotor assembly also defines an inner flow path boundary 62 of flow path 38, while the stator assembly defines an outer flow path boundary 64 of compressed air 38 flow path. The compressor section 12 includes a plurality of stages, with each stage including a row of circumferentially-spaced rotor blades 26 and a row of stator vanes 27. In this embodiment, rotor blades 26 are coupled to a rotor disk 24 with each rotor blade extending radially outwardly from rotor disk 24. Each rotor blade 26 includes an airfoil that extends radially from an inner blade platform 58 to rotor blade tip 60. A clearance 72 may be defined radially between the tip 60 of the rotor blade 26 airfoil and the inner casing 46. Similarly, the stator assembly includes a plurality of rows of stator vanes 27 with each row of vanes 27 positioned between adjacent rows of rotor blades 26. The compressor stages are configured to cooperate with a compressed air 38 working fluid, such as ambient air, with the working fluid being compressed in succeeding stages. Each row of stator vanes 27 extend radially inward from the inner casing 46 and includes an airfoil that extends from an outer vane platform 66 to a vane tip 68. A clearance 70 may be defined both radially between the tip 68 of the stator vane 27 airfoil and the rotor disk 24. Each airfoil includes a leading edge and a trailing edge as shown.

Figure 3:
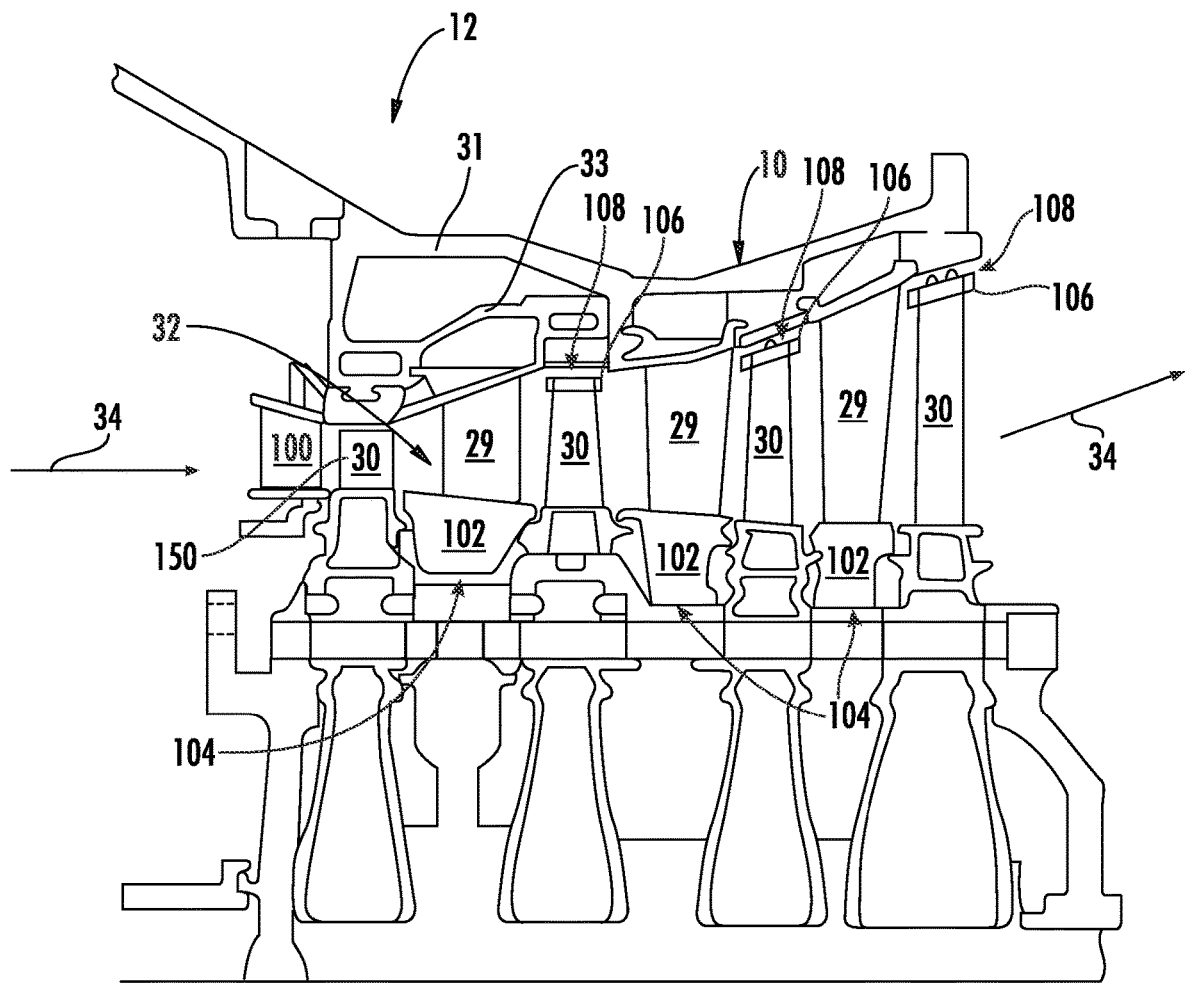
FIG. 3 illustrates a cross-sectional view of a turbine section, in accordance with embodiments of the present disclosure.

FIG. 3 illustrates an exemplary turbine section 18 of the gas turbine 10 including a plurality of turbine stages arranged in serial flow order. Each stage of the turbine includes a row of stationary turbine nozzles or vanes (e.g., stationary nozzles 29) disposed axially adjacent to a corresponding rotating row of turbine rotor blades (e.g., blades 30). Four turbine stages are illustrated in FIG. 3. The exact number of stages of the turbine section 18 may be more or less than the four stages illustrated in FIG. 3. The four stages are merely exemplary of one turbine design and are not intended to limit the presently claimed turbine rotor blade in any manner.

Each stage comprises a plurality stationary nozzles 29 and a plurality of turbine rotor blades 30. The stationary nozzles 29 are mounted to the inner turbine casing 33 and are annularly arranged about an axis of a turbine rotor 36. Each stationary nozzle 29 may extend radially inward from the inner casing 33 to a stator shroud 102 coupled to the tip of the stationary nozzle 29. When the stationary nozzles 29 are installed around the inner circumference of the inner turbine casing 33, the stator shrouds 102 abut one another so as to define a substantially cylindrical shape surrounding the shaft turbine rotor 36. A clearance 104 may be defined radially between stator shroud 102 and the turbine rotor 36. The clearance 104 may extend continuously in the circumferential direction C around the turbine rotor 36.

As shown, the turbine rotor blades 30 are annularly arranged about the turbine rotor 36 and are coupled to the turbine rotor 36. Each turbine rotor blade 30 may include an airfoil having a leading edge, a trailing edge, a pressure side surface, and a suction side surface. In some embodiments, as shown, the turbine rotor blade 30 may include a tip shroud 106. When the turbine rotor blades 30 are installed around the inner circumference of the inner turbine casing 33, the tip shrouds 106 may abut one another so as to define a substantially cylindrical shape surrounding the airfoils and of the turbine rotor blades 30 and the turbine rotor 36. In many embodiments, a clearance 108 may be defined radially between stator shroud 102 and the turbine rotor 36. The clearance 108 may extend continuously in the circumferential direction C around the turbine rotor 36.

Figure 4:
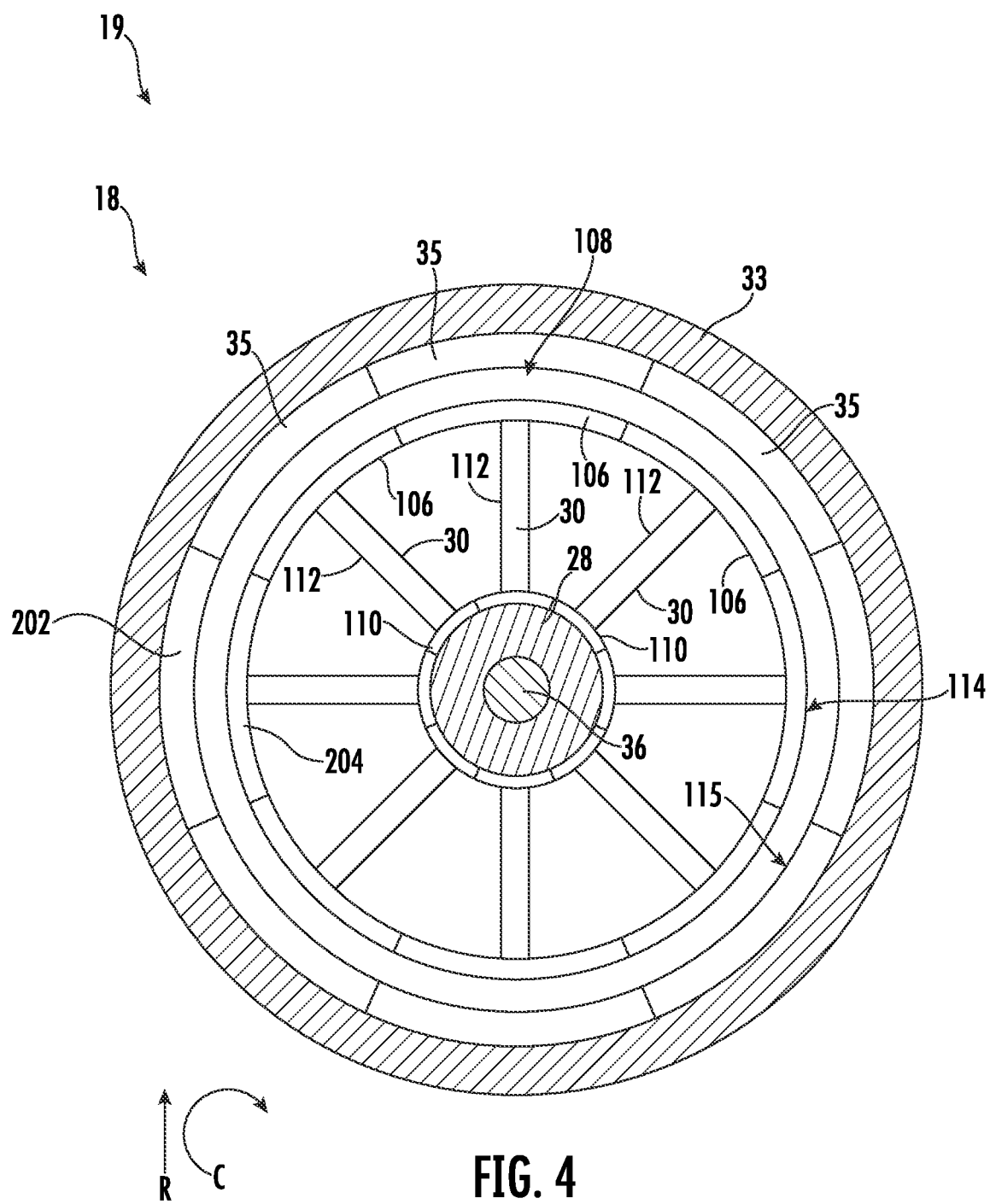
FIG. 4 illustrates a cross-sectional view of a rotor assembly of a turbine section, in accordance with embodiments of the present disclosure.

FIG. 4 illustrates a cross-sectional view of a rotor assembly 19 of the turbine section 18 from along an axial centerline of the gas turbine 10, in accordance with embodiments of the present disclosure. As shown in FIG. 4, a plurality of rotor blades 30 extend radially outward from a rotor disk 28. During operation of the gas turbine 10, the rotor blades 30 may move in a circumferential direction C (around the centerline of the gas turbine 10. In many embodiments, each rotor blade 30 in the plurality of rotor blades 30 includes a platform 110, a tip rail 106, and an airfoil 112 that extends radially between the platform 110 and the tip rail 106. As shown, the tip rail 106 of each rotor blade 30 in the plurality of rotor blades 30 abut one another to collectively form a tip rail ring 114 that extends continuously circumferentially around a centerline of the gas turbine 10. For example, the tip rail ring 114 extends around the turbine rotor 36. In many embodiments, the inner turbine casing 33 may be spaced apart (e.g. radially spaced apart) from the tip rail ring 114 such that a clearance 108 is defined between the tip rail ring 114 and the inner turbine casing 33. In some embodiments, the inner turbine casing 33 may support a plurality of shroud sections or blocks 35 that, when installed around the inner circumference of the inner turbine casing 33, abut one another so as to define a substantially cylindrical shape surrounding a portion of a turbine rotor 36 of the gas turbine 10. For example, the shroud blocks 35 may be supported by the inner turbine casing 35 such that they encase or surround one of a plurality of stages of rotor blades 30 turbine section 18. In many embodiments, the shroud blocks 35 may abut one another in the circumferential direction C and collectively define shroud ring 115 that is radially spaced apart from the tip rail ring 114. In such embodiments, the clearance 108 may be defined between the tip rail 106 of the rotor blades 30 and the shroud blocks 35 of the inner turbine casing 33.

Figure 5:
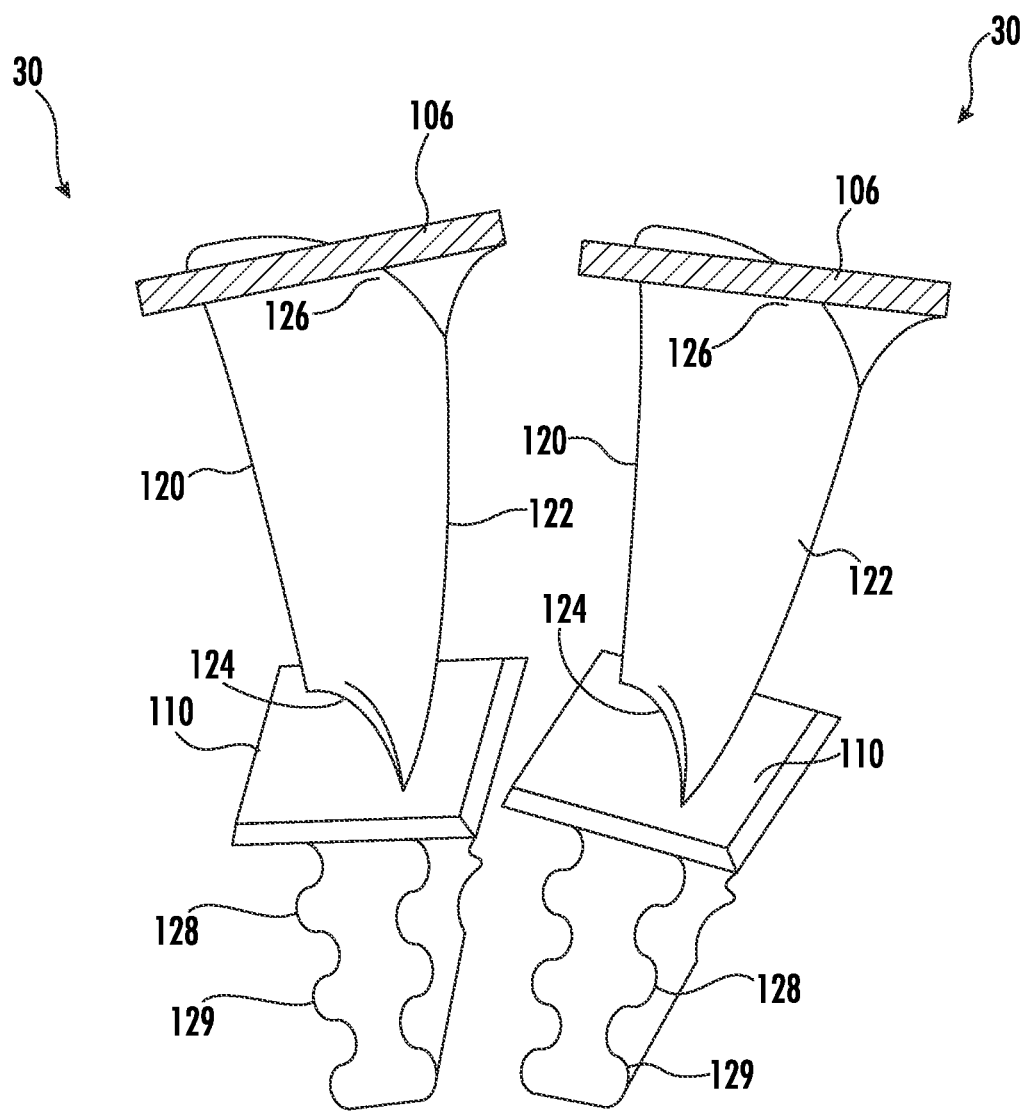
FIG. 5 illustrates a perspective view of two neighboring rotor blades, in accordance with embodiments of the present disclosure.

FIG. 5 illustrates a perspective view of two neighboring rotor blades 30, in accordance with embodiments of the present disclosure. As shown, each of the rotor blades includes a platform 110, a tip rail 106, and an airfoil 112 extending between the platform 110 and the tip rail 106.

The airfoil 112 may have a generally aerodynamic contour and may include a pressure side wall, opposing suction side wall, a leading edge 120, and a trailing edge 122. The pressure side wall generally comprises an aerodynamic, concave external surface of the airfoil 112. Similarly, the suction side wall may generally define an aerodynamic, convex external surface of the airfoil 112. In many embodiments, the airfoil 112 may extend from root 124 coupled to the platform 110 to a tip 126, the tip rail 106 may extend from the tip 126 across the airfoil 112. In various embodiments, each rotor blade 30 may include a shank 128 extending radially inward from the platform 110. As is generally understood, the shank 128 may include a dovetail 129 that couples the rotor blade 30 to a rotor disk.

Figure 6:
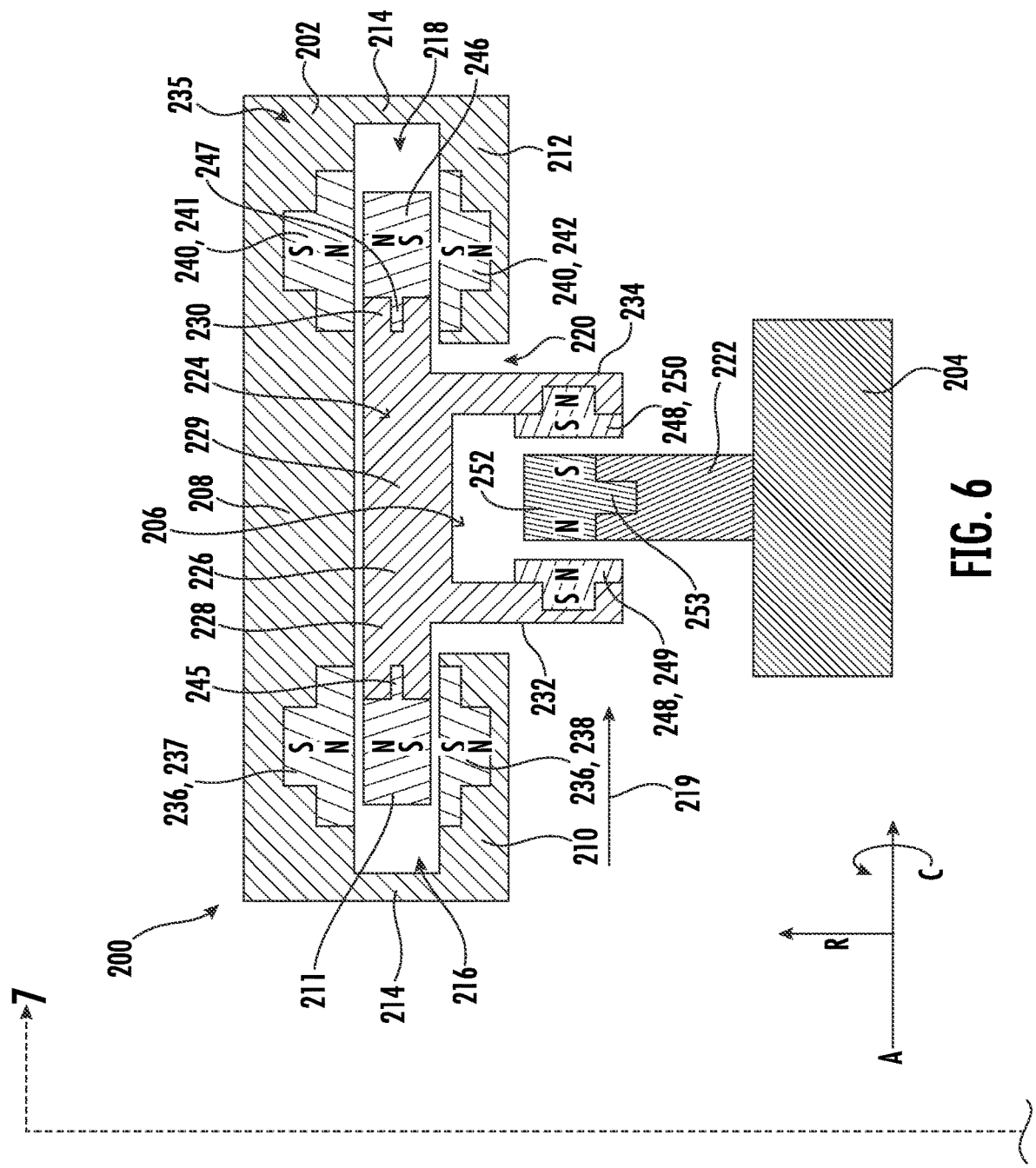
FIG. 6 illustrates a sealing arrangement, in accordance with embodiments of the present disclosure.

FIG. 6 illustrates a sealing arrangement 200 for use in a turbomachine, such as the gas turbine 10 described herein, in accordance with embodiments of the present disclosure. The sealing arrangement 200 may include a stationary component 202 of the gas turbine 10, such as the inner casing 46 of the compressor section 14, one or more stator vanes 27 of the compressor section 14, the inner turbine casing 33, one or more stationary nozzles 29 of the turbine section 18, one or more shroud blocks 35, or other stationary gas turbine 10 components.

The sealing arrangement 200 may further include a rotating component 204, i.e., a component that rotates in the circumferential direction C of the gas turbine 10. In many embodiments, the rotating component 204 may be directly or indirectly attached to the shaft 22, thereby rotating in the circumferential direction C along with other gas turbine 10 components. The rotating component 204 may be, but is not limited to, a rotor blade 26 of the compressor section 14, a rotor disk 24 of the compressor section 14, a rotor blade 30 of the turbine section 18, or a rotor disk 28 of the turbine section 18. In exemplary embodiments, the rotating component 204 may be a tip rail 106 of a rotor blade 30.

As shown in FIG. 6, a clearance 206 may be defined between the stationary component 202 and the rotating component 204, in order to prevent frictional wear between the stationary component 202 and the rotating component 204. As may be appreciated, due to the high operating temperatures of the gas turbine 10, either or both of the stationary component 202 and the rotating component 204 may experience thermal expansion and contraction, thereby altering the distance between the components 202, 204 and the clearance 206. The clearance 206 may between the stationary component 202 and the rotating component 204 may be representative of any of the other clearances discussed herein, e.g., clearance 70, clearance 72, clearance 104, and/or clearance 108. In exemplary embodiments, the clearance 206 may be defined between the turbine rotor blade 30 tip shrouds 106 and the plurality of shroud blocks 35 (FIG. 4). One of ordinary skill in the art should understand that the present subject matter is not limited to any particular configuration and that the sealing arrangement 200 described herein may be advantageous for any stationary component and rotating component of the gas turbine 10.

As shown in FIG. 6, the stationary component may include an outer wall 208, a first inner wall 210, and a second inner wall 212. The first inner wall 210 and the second inner wall 212 may be spaced apart (e.g. radially spaced apart) from the outer wall 208, such that a first slot 216 is defined between the outer wall 208 and the first inner wall 210 and a second slot 218 is defined between the outer wall 208 and the second inner wall 212. In many embodiments, the first inner wall 210 and the second inner wall may be aligned with one another in the radial direction R, and may both extend generally in the axial direction A. Similarly, the first slot 216 and the second slot 218 may be radially and axially aligned, such that they collectively form a rectangular shaped slot. In various embodiments, the first inner wall 210 and the second inner wall 212 may be spaced apart from each other in the axial direction A, such that an opening 220 is defined axially between the inner walls 210, 212.

In many embodiments the outer wall 208 may be generally parallel to both the first inner wall 210 and the second inner wall 212. In various embodiments, the stationary component 202 may include side walls 214 that are axially spaced apart from one another and extend between the outer wall 208 and one of the first inner wall 210 or the second inner wall 212. For example, the side walls may extend generally perpendicularly to the outer wall 208 and the inner walls 210, 212, such that the stationary component generally defines a rectangular-shaped slot that is continuous in the circumferential direction C.

In exemplary embodiments, the rotating component 204 may be spaced apart from the stationary component 202, e.g., the rotating component 204 may be positioned radially inward of the stationary component 202. For example, the rotating component 204 may move in the circumferential direction C relative to the stationary component 202. In some embodiments, the rotating component 204 may include a tip rail 222 that extends radially outward from the rotating component 204. In many embodiments, the tip rail 222 may be the tip rail 106 of the turbine rotor blade 30 discussed above.

In many embodiments, as shown in FIG. 6, a floating seal 224 may be positioned between the stationary component 202 and the rotating component 204, in order to restrict a leakage flow 219 between the stationary component 202 and the rotating component 204, thereby increasing the efficiency of the gas turbine 10. The leakage flow 219 may be excess air (if sealing arrangement 200 is within compressor section 14) or excess combustion gases (if sealing arrangement 200 is in turbine section 18). As may be appreciated, minimizing the amount of leakage flow 219 passing across the clearance 206 may advantageously increase the overall efficiency of the gas turbine 10 by minimizing waste. In addition, the floating seal 224 may not contact any surfaces during operation of the gas turbine 10, such that frictional wear on the seal is reduced and/or entirely eliminated.

In exemplary embodiments, the floating seal 224 may include an axial member 226 having a first arm 228 that extends into the first slot 216, a second arm 230 extending into the second slot 218, and a middle portion 229 extending between the arms 228, 230. In many embodiments, the floating seal 224 may include a first radial member 232 and a second radial member 234 extending from the axial member 226. In various embodiments, the axial member 226 may be generally perpendicular to the radial members 232, 234. The radial members 232, 234 may be axially spaced apart from one another, such that they extend on either side of the tip rail 222. In some embodiments, the floating seal 224 may be one continuous seal that extends seamlessly between the axial member 226 and the radial members 232, 234. For example, the radial members 232, 234 may extend from the axial member 226 at the division between the arms 228, 230 and the middle portion 229 of the axial member 226.

In particular embodiments, a plurality of magnets 235 may be coupled to the stationary component 202, the rotating component 204, and the floating seal 224. The plurality of magnets 235 may include all of the magnets within the sealing arrangement 200, e.g., the magnets 237, 238, 241, 242, 244, 246, 249, 250, and 252. For example, the plurality of magnets 235 may be arranged such that the floating seal 235 is contained between the stationary component 202 and the rotating component 204. For example, the plurality of magnets 235 may be arranged in order to produce repulsive magnetic forces that advantageous maintain the alignment the floating seal 224. In addition, the plurality of magnets 235 may be arranged such that the floating seal 224 is forced out of contact with both the stationary component 202 and the rotating component 204 by the repulsive magnetic forces produced. In this way, the floating seal 224 may "float" or "hover" within the clearance 206 relative to the stationary component 202 and the rotating component 204, which advantageously prolongs the life of the floating seal 224 due to decreased frictional wear over time. In operation of the gas turbine 10, the floating seal 224 may be spaced apart from both the stationary component 202 and the rotating component 204 (not in contact with either of 202 or 204) by repulsive magnetic forces produced by the plurality of magnets 235, such that such that the floating seal 224 "hovers" or "floats" within the clearance 206, thereby restricting the leakage flow 219 across the clearance 206 without frictionally wearing on the components 202, 204.

The plurality of magnets 235 include a first pair of magnets 236 and a second pair of magnets 240 embedded within the stationary component 202. For example, the first pair of magnets 236 may be positioned within the stationary component across the first slot 216 from one another. In many embodiments, the first pair of magnets 236 may be embedded within the stationary component 202 such that they partially define the first slot 216. Similarly, the second pair 240 of magnets may be positioned within the stationary component across the second slot 218 from one another. In many embodiments, the second pair of magnets 240 may be embedded within the stationary component 202 such that they partially define the second slot 218.

As shown in FIG. 6, the first pair of magnets 236 may include a first outer magnet 237 and a first inner magnet 238. The first outer magnet 237 may be positioned within, and coupled to, the outer wall 208 of the stationary component 202, such that the first outer magnet 237 at least partially defines a boundary of the first slot 216. In many embodiments, the first inner magnet 238 may be positioned within, and coupled to, the first inner wall 210, such that the first inner magnet 238 at least partially defines the first slot 216 opposite the first outer magnet 237. In exemplary embodiments, the first outer magnet 237 and the first inner magnet 238 may be radially aligned with one another, such that they extend coaxially with respect to a radial centerline of the magnets 237, 238, which advantageously allows for a uniform magnetic field within the first slot 216 that enhances the floating seal 224 alignment. In various embodiments as shown, the first pair of magnets 236 may be generally shaped as a "T" having a longer portion that faces the first slot 216.

Likewise, the second pair of magnets 240 may include a second outer magnet 241 and a first inner magnet 242. The second outer magnet 241 may be positioned within, and coupled to, the outer wall 208 of the stationary component 202, such that the second outer magnet 241 at least partially defines a boundary of the second slot 218. In many embodiments, the second inner magnet 242 may be positioned within, and coupled to, the second inner wall 212, such that the second inner magnet 242 at least partially defines the second slot 218 opposite the second outer magnet 241. In exemplary embodiments, the second outer magnet 241 and the second inner magnet 242 may be radially aligned with one another, such that they extend coaxially with respect to a radial centerline of the magnets 241, 242, which advantageously allows for a uniform magnetic field within the second slot 218 that enhances the floating seal 224 alignment. In various embodiments as shown, the second pair of magnets 240 may be generally shaped as a "T" having a longer portion that faces the second slot 218.

As shown in FIG. 6, a first axial seal magnet 244 may be attached to the first arm 228 of the axial member 226 of the floating seal 224. For example, the first axial seal magnet 244 may connect to the first arm 228 via a connection member 245, which may be welded or otherwise fixedly coupled to the first arm 228. In other embodiments, the first axial seal magnet 244 may be connected to the first arm 228 in various other manners. The first axial seal magnet may extend from the first arm 228 into the first slot 216 and may be positioned between, and spaced apart from, the first pair of magnets 236. In exemplary embodiments the first axial seal magnet 244 may be repulsed (by a repulsive magnetic force) from the first pair of magnets 236, such that the first axial seal magnet 244 is held in place radially between, and spaced apart from, the first pair of magnets 236 by the repulsive magnetic force exerted on the first axial seal magnet 244 by the first pair of magnets 236.

Likewise, a second axial seal magnet 246 may be attached to the second arm 230 of the axial member 226 of the floating seal 224. For example, the second axial seal magnet 246 may connect to the first arm 228 via a connection member 247, which may be welded or otherwise fixedly coupled to the second arm 230. In other embodiments, the second axial seal magnet 246 may be connected to the second arm 230 in various other manners. The second axial seal magnet 246 may extend from the second arm 230 into the second slot 218 and may be positioned between, and spaced apart from, the second pair of magnets 240. In exemplary embodiments the second axial seal magnet 246 may be repulsed (by a repulsive magnetic force) from the second pair of magnets 240, such that the second axial seal magnet 246 is held in place radially between, and spaced apart from, the first pair of magnets 240 by the repulsive magnetic force exerted on the second axial seal magnet 246 by the first pair of magnets 240.

As shown in FIG. 6, the first pair of magnets 236 and the first axial seal magnet 244 may be axially spaced apart from the second pair of magnets 240 and the second axial seal magnet 246, in order to equally distribute the magnetic forces and maintain radial alignment of the floating seal 244 at every location. In this way, the floating seal 224 may be forced into a radial position between, and spaced apart from, the pairs of magnets 236, 240, by the repulsive magnetic forces that the pairs of magnets 236, 240 exert on the axial seal magnets 244, 246.

In exemplary embodiments, the plurality of magnets 235 further includes a third pair of magnets 248 positioned opposite from one another and embedded within the floating seal 224. For example, the third pair of magnets 248 may be embedded within the first radial member 232 and the second radial member 234 opposite to one another. In many embodiments, the third pair of magnets 248 may includes a first radial seal magnet 249 embedded within the first radial member 232 and a second radial seal magnet 250 embedded within the second radial member 234. In exemplary embodiments, the first radial seal magnet 249 and the second radial seal magnet 250 may be axially aligned with one another, such that they extend coaxially with respect to an axial centerline of the magnets 249, 250, which advantageously allows for a uniform magnetic field in the axial direction A that enhances the floating seal 224 alignment. In various embodiments as shown, the third pair of magnets 248 may be generally shaped as a "T" having a longer portion that faces a tip rail magnet 252.

In many embodiments, the tip rail magnet 252 is attached to the tip rail 222 of the rotating component 204, such that the tip rail magnet 252 rotates along with the rotating component 204, between the radial members 232, 234 of the floating seal 224, in the circumferential direction C. As shown in FIG. 6, the tip rail magnet 252 may extend between the third pair of magnets 248, such that the third pair of magnets 248 are repulsed by a magnetic field produced by the tip rail magnet 252, which advantageously forces the floating seal 224 into alignment in the axial direction A. For example, the tip rail magnet 252 may connect to the tip rail 222 via a connection member 253, which may be welded or otherwise fixedly coupled to the tip rail 222. In other embodiments, the second axial seal magnet 246 may be connected to the second arm 230 in various other manners. The tip rail magnet 252 may extend from the tip rail 222 into a space defined between the magnets 249, 250. In exemplary embodiments, the third pair of magnets 248 may be repulsed (by a repulsive magnetic force) from the tip rail magnet 252, such that the magnetic field produced by the third pair of magnets 248 and the tip rail magnet 252 holds the floating seal 224 axially in place.

In many embodiments, each magnet in the plurality of magnets 235 discussed herein may be a permanent magnet, such that the magnets 235 are made of a material(s) that is magnetized by an external magnetic field and remains magnetized after the external field is removed. In this way, the magnets 235 continuously create their own magnetic field. In many embodiments, the magnets 235 may be in the form of a piece of metal material that has its component atoms so ordered that the material exhibits properties of magnetism, such as attracting other iron-containing objects or aligning itself in an external magnetic field. In exemplary embodiments, the magnets 235 may be Alnico magnets, such that they are permanent magnets that are primarily made up of a combination of aluminum (Al), nickel (Ni), and cobalt (Co) but may also include copper, iron and titanium. Alnico magnets may be capable of operation in extremely high temperatures, such as upwards of 1000° F.

Although the plurality of magnets 235 are shown in FIG. 6 as having the poles (north pole "N" and south pole "S") labeled on specific ends, it is envisioned to be within the scope of the present disclosure that each of the poles may be switched, thereby yielding the same configuration but with an opposite magnetic pole orientation.

In various embodiments, the sealing assembly 200 described herein may employed any of the clearances discussed herein, e.g., clearance 70, clearance 72, clearance 104, and/or clearance 108, in order to restrict leakage flow between a stationary component and a rotating component of the gas turbine. In exemplary embodiments, the sealing assembly 200 described herein may be employed in the rotor assembly 19 (FIG. 4) described herein, such as within the clearance 108. In such embodiments, the shroud blocks 35 may be the stationary component. The tip rail ring 114 may be the rotating component. The floating seal 224 may extend across the clearance 108, in order to advantageously restrict and/or prevent combustion gases from passing through the clearance 108. In addition, the floating seal 224 described herein may advantageously be wear-resistant and self-aligning due to the plurality of magnets 235. For example, the magnets 235 ensure that the floating seal 224 does not contact the components 202, 204, thereby minimizing frictional wear of the floating seal 224. In addition, the magnets 235 maintain proper alignment of the floating seal 224 at all operating conditions of the gas turbine 10 (as discussed above the clearances change based on thermal conditions of the gas turbine 10).

Figure 7:
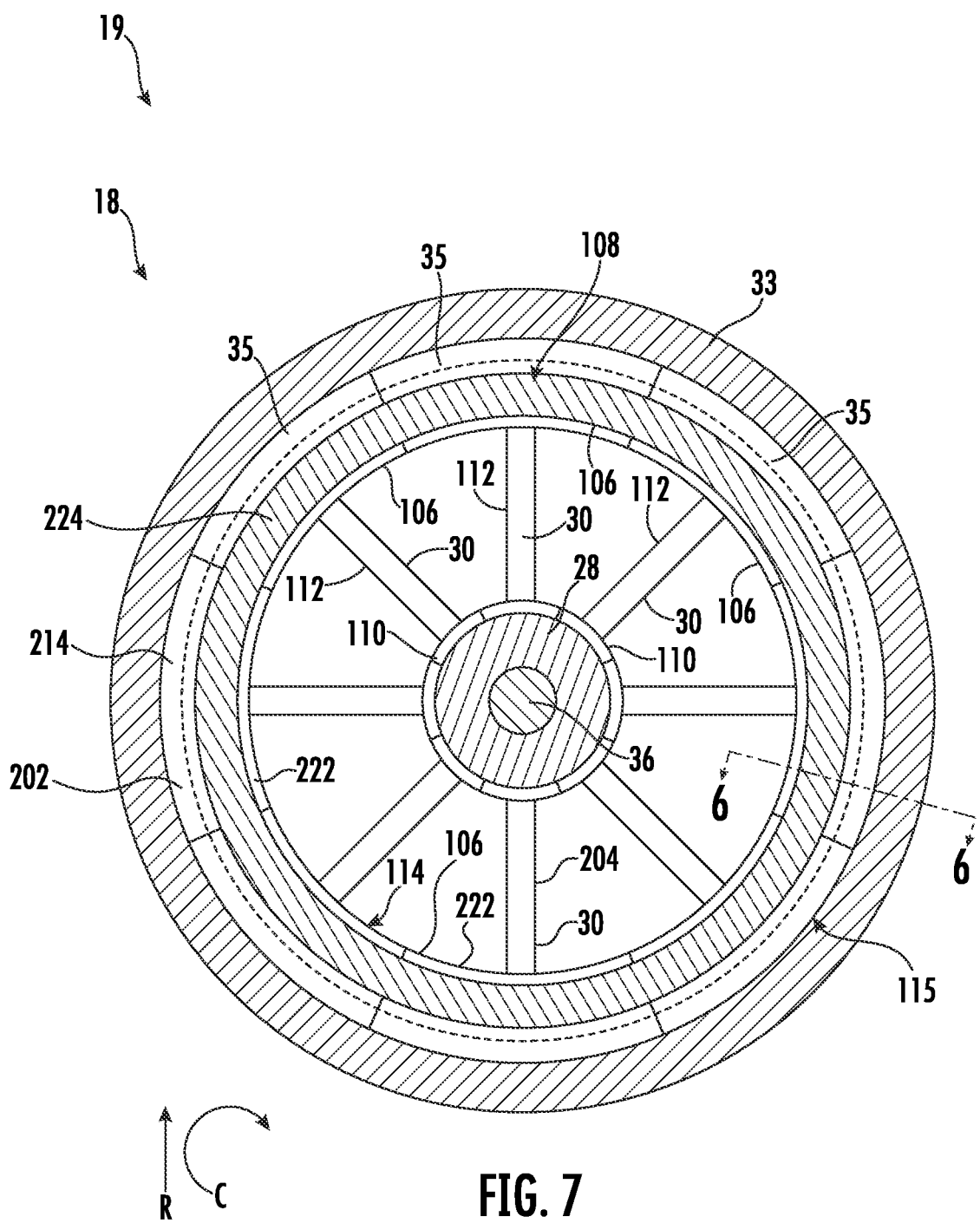
FIG. 7 illustrates a cross-sectional view of a rotor assembly of a turbine section having a floating seal employed within a clearance, in accordance with embodiments of the present disclosure.

In addition, in exemplary embodiments, the floating seal 224 may extend circumferentially around centerline 23 of the gas turbine 10, such that the floating seal 224 advantageously prevents leakage across the clearance 206 at every circumferential location. For example, FIG. 7 illustrates a cross-sectional view of a rotor assembly of a turbine section having a floating seal 224 employed within the clearance 108, between the tip rail ring 114 and the shroud ring 115. As shown, the floating seal 224 may extend circumferentially (either continuously or in a plurality of connected segments) around the centerline of the gas turbine 10, such that the clearance 108 is covered 360 degrees around the centerline of the gas turbine 10. As shown, the dashed line represents the portion of the floating seal 224 that is contained within the stationary component 202 (or the shroud ring 115 in the FIG. 7 embodiment).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A sealing arrangement for use in a gas turbine, the sealing arrangement comprising:
   a stationary component having an outer wall, a first inner wall, and a second inner wall, the first inner wall and the second inner wall spaced apart from the outer wall such that a first slot is defined between the outer wall and the first inner wall and a second slot is defined between the outer wall and the second inner wall;
   a rotating component spaced apart from the stationary component, the rotating component moving relative to the stationary component, wherein the rotating component includes a tip rail;
   a floating seal positioned between the stationary component and the rotating component, the floating seal including an axial member having a first arm extending into the first slot and a second arm extending into the second slot, and wherein the floating seal includes a first radial member and a second radial member extending from the axial member through an opening defined between the first inner wall and the second inner wall; and
   a plurality of magnets coupled to the stationary component, the rotating component, and the floating seal, the plurality of magnets arranged such that the floating seal is contained between the stationary component and the rotating component.

2. The sealing arrangement as in claim 1, wherein the plurality of magnets include a first pair of magnets and a second pair of magnets embedded within the stationary component, wherein the first pair of magnets are positioned across the first slot from one another, and wherein the second pair of magnets are positioned across the second slot from one another.

3. The sealing arrangement as in claim 2, wherein the first pair of magnets includes a first outer magnet positioned within the outer wall and a first inner magnet positioned within the first inner wall, and wherein the second pair of magnets includes a second outer magnet positioned within the outer wall and a second inner magnet positioned within the second inner wall.

4. The sealing arrangement as in claim 2, wherein a first axial seal magnet is attached to the first arm of the axial member and a second axial seal magnet is attached to the second arm of the axial member, wherein the first axial seal magnet extends between the first pair of magnets and the second axial seal magnet extends between the second pair of magnets.

5. The sealing arrangement as in claim 4, wherein the first axial seal magnet is repulsed by the first pair of magnets and the second axial seal magnet is repulsed by the second pair of magnets such that the floating seal is forced into alignment in a radial direction.

6. The sealing arrangement as in claim 1, wherein the plurality of magnets further comprises a third pair of magnets positioned opposite one another and embedded within the floating seal.

7. The sealing arrangement as in claim 6, wherein the third pair of magnets includes a first radial seal magnet embedded within the first radial member and a second radial seal magnet embedded within the second radial member.

8. The sealing arrangement as in claim 7, wherein a tip rail magnet is attached to the tip rail of the rotating component, the tip rail magnet extending between the third pair of magnets, and wherein the tip rail magnet is repulsed by the third pair of magnets such that the floating seal is forced into alignment in an axial direction.

9. The sealing arrangement as in claim 1, wherein the plurality of magnets is permanent magnets.

10. The sealing arrangement as in claim 1, wherein the plurality of magnets is alnico magnets.

11. A rotor assembly for a gas turbine, the rotor assembly comprising:
a plurality of rotor blades extending radially outward from a rotor disk, the plurality of rotor blades moving in a circumferential direction during operation of the gas turbine, each rotor blade in the plurality of rotor blades including a platform, a tip rail, and an airfoil extending between the platform and the tip rail, wherein the tip rails of each rotor blade in the plurality of rotor blades collectively form a tip rail ring that extends circumferentially around a centerline of the gas turbine;
a plurality of shroud blocks collectively form a shroud ring that extends circumferentially around the centerline of the gas turbine and is radially spaced apart from the tip rail ring, each shroud block having an outer wall, a first inner wall, and a second inner wall, the first inner wall and the second inner wall radially spaced apart from the outer wall such that a first slot is defined between the outer wall and the first inner wall and a second slot is defined between the outer wall and the second inner wall;
a floating seal positioned between the tip rail ring and the casing, the floating seal including an axial member having a first arm extending into the first slot and a second arm extending into the second slot, and wherein the floating seal includes a first radial member and a second radial member extending from the axial member; and
a plurality of magnets coupled to the shroud ring, the tip rail ring, and the floating seal, the plurality of magnets arranged such that the floating seal is contained between the shroud ring and the tip rail ring.

12. The rotor assembly as in claim 11, wherein the plurality of magnets include a first pair of magnets and a second pair of magnets embedded within the shroud ring, wherein the first pair of magnets are positioned across the first slot from one another, and wherein the second pair of magnets are positioned across the second slot from one another.

13. The rotor assembly as in claim 12, wherein the first pair of magnets includes a first outer magnet positioned within the outer wall and a first inner magnet positioned within the first inner wall, and wherein the second pair of magnets includes a second outer magnet positioned within the outer wall and a second inner magnet positioned within the second inner wall.

14. The rotor assembly as in claim 12, wherein a first axial seal magnet is attached to the first arm of the axial member and a second axial seal magnet is attached to the second arm of the axial member, wherein the first axial seal magnet extends between the first pair of magnets and the second axial seal magnet extends between the second pair of magnets.

15. The rotor assembly as in claim 14, wherein the first axial seal magnet is repulsed by the first pair of magnets and the second axial seal magnet is repulsed by the second pair of magnets such that the floating seal is forced into alignment in a radial direction.

16. The rotor assembly as in claim 11, wherein the plurality of magnets further comprises a third pair of magnets positioned opposite another and embedded within the floating seal.

17. The rotor assembly as in claim 16, wherein the third pair of magnets includes a first radial seal magnet embedded within the first radial member and a second radial seal magnet embedded within the second radial member.

18. The rotor assembly as in claim 17, wherein a tip rail magnet is attached to the tip rail of the rotor blade, the tip rail magnet extending between the third pair of magnets, and wherein the tip rail magnet is repulsed by the third pair of magnets such that the floating seal is forced into alignment in an axial direction.

19. The rotor assembly as in claim 11, wherein the plurality of magnets are permanent magnets.

20. The rotor assembly as in claim 11, wherein the plurality of magnets are alnico magnets.

* * * * *